(12) United States Patent
Romaniuk

(10) Patent No.: US 6,374,017 B1
(45) Date of Patent: Apr. 16, 2002

(54) PHASE DEPENDENT SPLITTER/COMBINER 4-PORT COUPLER DEVICE

(76) Inventor: Charles Christopher Romaniuk, Box 3295, Vermilion, Alberta (CA), T9X 2B2

( * ) Notice: Subject to any disclaimer, the term of this patent is extended or adjusted under 35 U.S.C. 154(b) by 0 days.

(21) Appl. No.: 09/676,492

(22) Filed: Oct. 2, 2000

(51) Int. Cl.⁷ ................................................. G02B 6/26
(52) U.S. Cl. .......................................... 385/39; 326/99
(58) Field of Search ............................ 385/16, 45, 48, 385/24, 17, 39; 326/99, 104

(56) References Cited

U.S. PATENT DOCUMENTS 5,828,796 A * 10/1998 Han et al. ........................ 385/9

OTHER PUBLICATIONS

Yariv, A. (1973). Coupled–Mode Theory for Guided–Wave Optics. "IEEE Journal of Quantum Electronics, QE–9, 9" 919–933.
Zappe, H.P. (1995). "Introduction to Semiconductor Integrated Optics". Boston, MA: Artech House, Inc. p. 207–209.
Saleh, B. E. & Teich, M. C. (1991). "Fundamentals of Photonics". New York, NY: John Wiley & Sons, Inc. p. 264–269.

* cited by examiner

Primary Examiner—John D. Lee
Assistant Examiner—Jerry Rahll

(57) ABSTRACT

A phase dependent splitter/combiner 4-port coupler device is composed of two duplicating stages and a cross-over stage and provides the phase dependent splitting and combining functionality of a 4-port coupler without the ambiguity of the coupling coefficient of coupled mode analysis. The 4-port coupler device receives two input signals and produces two output signals. Each duplicating stage consists of an amplifier and a splitter and produces the two duplicated signals. The cross-over stage receives the four duplicated signals from the two duplicating stages, consists of a phase inverter and two combiners, and produces two output signals. If the combiners are 3 dB couplers, the 4-port coupler device performs a splitter operation or a combiner operation. If the combiners are non-3 dB couplers, the 4-port coupler device performs a replicator operation or a combiner operation. The device can be used for optic, including infrared and ultraviolet, or microwave signals.

17 Claims, 3 Drawing Sheets

PHASE DEPENDENT SPLITTER/COMBINER 4-PORT COUPLER DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates in general to optical 4-port couplers and relates in particular to 4-port couplers operating as splitters and combiners.

2. Discussion of Related Art 4-port couplers are commonly used integrated optic devices. 4-port couplers are typically used for splitting a signal into two signals of half power and can also be used to combine two signals, producing one or two output signals. A 4-port coupler that produces phase dependent output signals is used as a combiner and splitter in a coupler-based programmable phase logic device, which is disclosed in U.S. patent application Ser. No. (Attorney Docket No. 2000-004), assigned to the assignee of this application.

Integrated optic 4-port couplers are also known as directional couplers, are symmetric devices with no unique physical orientation, and are described by coupled mode analysis. The interaction between two input signals, and the resulting output signals, is partially described by a coupling coefficient. In coupled mode analysis, the coupling coefficient or the complex conjugate of the coupling coefficient can be used to describe signal interaction. However, this results in a physical ambiguity because the arbitrary choice of the coupling coefficient or the complex conjugate of the coupling coefficient affects the input and output phase values. According to coupled mode analysis, an input signal directed into the first input port of a 4-port coupler operating as a signal splitter will produce output signals with different phase values from the output signals generated by the same input signal directed into the second input port of the 4-port coupler. Therefore, coupled mode analysis indicates that the 4-port coupler has a phase dependent orientation, even though the 4-port coupler has no unique physical or manufacturable orientation. This ambiguity increases the difficulty for producing consistent phase dependent circuits using 4-port couplers.

It is, therefore, an object of the present invention to provide a 4-port coupler that is not ambiguous in design and produces predictable phase dependent splitting and combining operation results.

BRIEF SUMMARY OF THE INVENTION

The phase dependent splitter/combiner 4-port coupler device employs two amplifiers, two splitters, a phase inverter, and two combiners. The 4-port coupler device produces two output signals with predictable phase values from given input signals.

The 4-port coupler device receives two input signals and is composed of two duplicating stages and a cross-over stage. Each duplicating stage receives one input signal, consists of one of the amplifiers and one of the splitters, and produces two duplicated signals. The cross-over stage receives the four duplicated signals from the two duplicating stages, consists of the phase inverter and the two combiners, and produces the two output signals.

The 4-port coupler device receives the two input signals, that are preferably either equal in phase or opposite in phase, and produces the two output signals. In the duplicating stages, the two input signals are preferably doubled by the amplifiers and then split to produce the four duplicated signals. The four duplicated signals are intermixed so that the first duplicated signal is combined with the third duplicated signal in a first combiner and a phase inverter inverts the phase of the second duplicated signal before it is combined with the fourth duplicated signal in a second combiner.

The device has a well-defined phase dependent operation that can be designed for a particular set of output signals by the placement of one or more phase inverters.

Two types of combiners that can be used in the cross-over stage are 3 dB couplers and non-3 dB couplers. If the combiners are 3 dB couplers and only one 4-port coupler device input signal is present, the 4-port coupler device performs a splitter operation and the input signal is preferably split between the two output signals. An input signal directed into the first input port of the 4-port coupler device will produce a first output signal that is half the intensity of, and equal in phase to, the input signal and a second output signal that is half the intensity of, and opposite in phase to, the input signal. An input signal directed into the second input port of the 4-port coupler device will produce two output signals that are half the intensity of, and equal in phase to, the input signal.

If the combiners are 3 dB couplers and two input signals are present, the 4-port coupler device performs a combiner operation. When two 4-port coupler device input signals are present, the first output signal of the 4-port coupler device is the phase dependent sum or partial sum of the input signals and the second output signal of the 4-port coupler device is the phase dependent difference or partial difference between the second input signal and first input signal.

If the combiners are non-3 dB couplers and only one 4-port coupler device input signal is present, the 4-port coupler device performs a replicator operation, providing two output signals that are preferably equal in intensity to the input signal. An input signal directed into the first input port of the 4-port coupler device will produce a first output signal that is equal in intensity and phase to the input signal and a second output signal that is equal in intensity, and opposite in phase, to the input signal. An input signal directed into the second input port of the 4-port coupler device will produce two output signals that are equal in intensity and phase to the input signal.

If the combiners are non-3 dB couplers and two 4-port coupler device input signals are present, the 4-port coupler device performs a combiner operation. If two 4-port coupler device input signals are present, the first output signal of the 4-port coupler device is preferably the phase dependent sum of the input signals and the second output signal of the 4-port coupler device is preferably the phase dependent difference between the second input signal and first input signal.

The device can be used for optic, including infrared and ultraviolet, or microwave signals.

DETAILED DESCRIPTION OF THE INVENTION

Figure 1:
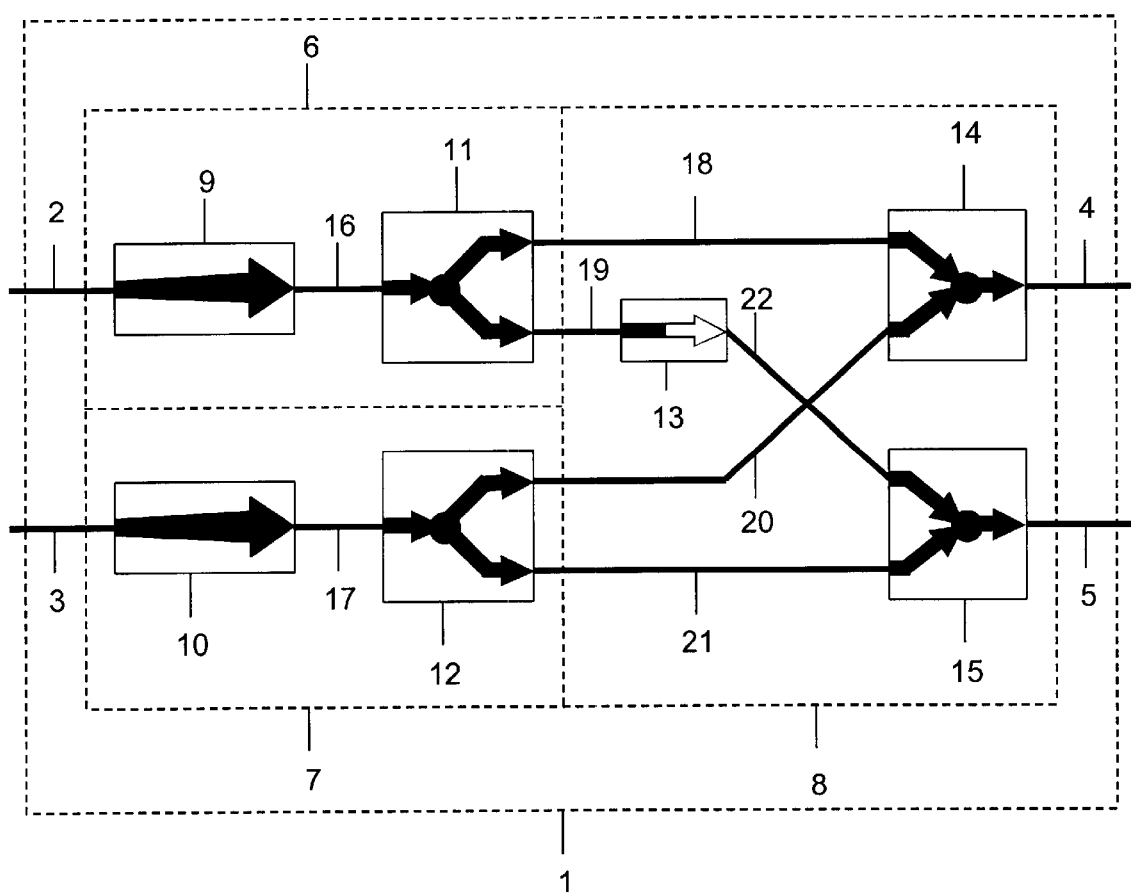
FIG. 1. shows a schematic of an embodiment of a phase dependent splitter/combiner 4-port coupler device.

Referring to FIG. 1, a phase dependent splitter/combiner 4-port coupler device 1 receives two input signals 2, 3 and produces two output signals 4, 5. The phase dependent splitter/combiner 4-port coupler device 1 is composed of two duplicating stages 6, 7 and a cross-over stage 8. The duplicating stages 6, 7 consist of two amplifiers 9, 10 and two splitters 11, 12. The cross-over stage 8 consists of a phase inverter 13 and two combiners 14, 15.

In the duplicating stages 6, 7, the amplifiers 9, 10 increase the intensity of the input signals 2, 3 to produce two amplified signals 16, 17. Then the splitters 11, 12 split the amplified signals 16, 17 to produce four duplicated signals 18, 19, 20, 21.

In the cross-over stage 8, the first duplicated signal 18 is combined with the third duplicated signal 20 in the first combiner 14 to produce the first output signal 4. The second duplicated signal 19 is inverted by the phase inverter 13 and then combined with the fourth duplicated signal 21 in the second combiner 15 to produce the second output signal 5.

The following description of the form and operation of the phase dependent splitter/combiner 4-port coupler device 1 is illustrated by way of example only.

The input signals 2, 3 are externally generated signals, such as laser beams or maser beams, and are preferably coherent signals with known phase values. The input signals 2, 3 are preferably either equal in phase or opposite in phase to each other. For example, the input signals 2, 3 can be expressed, using an arbitrary relative intensity of I, as First Input=1Isin(x+0°)

Second Input=1Isin(x+0°)

where both signals have a relative intensity of 1 and a relative phase shift of 0°. The input signals 2, 3 are directed into the duplicating stages 6, 7.

In the first duplicating stage 6, the first input signal 2 is directed into the first amplifier 9, such as a semiconductor laser amplifier or an erbium doped waveguide. The amplification of the first amplifier 9 is set so that the first input signal 2 is preferably doubled in intensity. The first amplifier 9 produces the first amplified signal 16. For example, the first amplified signal 16 is First Amplified=2Isin(x+0°)

The first amplified signal 16 is directed into the first splitter 11, such as an integrated optic Y-branch, and is split to produce the first duplicated signal 18 and the second duplicated signal 19 that are preferably equal to the first input signal 2. For example, the first and second duplicated signals 18, 19 are First Duplicated=1Isin(x+0°)

Second Duplicated=1Isin(x+0°)

In the second duplicating stage 7, the second input signal 3 is directed into the second amplifier 10, which is similar in design to the first amplifier 9 in the first duplicating stage 6. The amplification of the second amplifier 10 is set so that the second input signal 3 is preferably doubled in intensity.

The second amplifier 10 produces the second amplified signal 17. For example, the second amplified signal 17 is Second Amplified=2Isin(x+0°)

The second amplified signal 17 is directed into the second splitter 12, which is similar in design to the first splitter 11 in the first duplicating stage 6, and is split to produce the third duplicated signal 20 and the fourth duplicated signal 21 that are preferably equal to the second input signal 3. For example, the third and fourth duplicated signals 20, 21 are Third Duplicated=1Isin(x+0°)

Fourth Duplicated=1Isin(x+0°)

The four duplicated signals 18, 19, 20, 21 are directed into the cross-over stage 8. The first duplicated signal 18 and the third duplicated signal 20 are directed into the first combiner 14, such as an integrated optic 3 dB Y-branch, where they are combined to produce the first output signal 4. For example, the first output signal 4 is First Output=2Isin(x+0°)

The second duplicated signal 19 is directed into the phase inverter 13, which induces a 180° relative phase shift, to produce an inverted second duplicated signal 22 that is opposite in phase to the second duplicated signal 19. For example, the inverted second duplicated signal 22 is Inverted Second Duplicated=1Isin(x+180°)=−1Isin(x+0°)

The inverted second duplicated signal 22 and the fourth duplicated signal 21 are directed into the second combiner 15, which is similar in design to the first combiner 14, where they are combined to produce the second output signal 5. For example, the second output signal 5 is Second Output=0

The combiners 14, 15 are preferably 3 dB couplers, such as integrated optic 3 dB Y-branches. A 3 dB coupler has a particular functionality. If a single input signal is directed into either one of the input ports of a 3 dB coupler functioning as a combiner, an output signal will be produced that is half the intensity of, and equal in phase to, the input signal. If two equal intensity input signals of either equal phase or opposite phase are directed into a 3 dB coupler functioning as a combiner, the output signal will be the sum of the input signals. If two unequal intensity input signals of either equal phase or opposite phase are directed into a 3 dB coupler functioning as a combiner, it is believed that the output signal is $$3 \text{ dB Coupler Output} = \frac{(A+B)^2}{2 \cdot C}$$

where A is the relative intensity and phase of the first input signal of the 3 dB coupler, B is the relative intensity and phase of the second input signal of the 3 dB coupler, and C is the relative intensity and phase of the input signal with the larger relative intensity. For example, if A is 1 and B is −2, C is −2 and the 3 dB coupler output signal is −0.25.

Table 1 summarizes the relative intensities and phases of example signals in the phase dependent splitter/combiner 4-port coupler device 1 using 3 dB couplers for the combiners 14, 15. A negative value indicates a signal with a relative phase shift of 180°.

TABLE 1

| Signal | 2 | 3 | 16 | 17 | 18 | 20 | 4 | 19 | 22 | 21 | 5 |
|---|---|---|---|---|---|---|---|---|---|---|---|
| Value | 1 | 1 | 2 | 2 | 1 | 1 | 2 | 1 | -1 | 1 | 0 |
| Value | 1 | -1 | 2 | -2 | 1 | -1 | 0 | 1 | -1 | -1 | -2 |
| Value | -1 | 1 | -2 | 2 | -1 | 1 | 0 | -1 | 1 | 1 | 2 |
| Value | -1 | -1 | -2 | -2 | -1 | -1 | -2 | -1 | 1 | -1 | 0 |
| Value | 2 | 0 | 4 | 0 | 2 | 0 | 1 | 2 | -2 | 0 | -1 |
| Value | -2 | 0 | -4 | 0 | -2 | 0 | -1 | -2 | 2 | 0 | 1 |
| Value | 0 | 2 | 0 | 4 | 0 | 2 | 1 | 0 | 0 | 2 | 1 |
| Value | 0 | -2 | 0 | -4 | 0 | -2 | -1 | 0 | 0 | -2 | -1 |

Table 2 summarizes the relative intensities and phases of the input and output signals 2, 3, 4, 5 for the example signals listed in Table 1.

TABLE 2

| Row | Signal | 2 | 3 | 4 | 5 |
|---|---|---|---|---|---|
| 1 | Value | 1 | 1 | 2 | 0 |
| 2 | Value | 1 | -1 | 0 | -2 |
| 3 | Value | -1 | 1 | 0 | 2 |
| 4 | Value | -1 | -1 | -2 | 0 |
| 5 | Value | 2 | 0 | 1 | -1 |
| 6 | Value | -2 | 0 | -1 | 1 |
| 7 | Value | 0 | 2 | 1 | 1 |
| 8 | Value | 0 | -2 | -1 | -1 |

The 4-port coupler device 1 performs a combiner operation and a splitter operation when 3 dB couplers are used for the combiners 14, 15. If both 4-port coupler device input signals 2, 3 are present, the 4-port coupler device 1 performs a combiner operation, as shown by rows 1–4 in Table 2. In the combiner operation, the first output signal 4 is the phase dependent sum or partial sum of the input signals 2, 3 and the second output signal 5 is the phase dependent difference or partial difference between the second input signal 3 and the first input signal 2.

If only one of the 4-port coupler device input signals 2, 3 is present, the 4-port coupler device 1 performs a splitter operation, as shown by rows 5–8 in Table 2. In the splitter operation, if the first input signal 2 is present and the second input signal 3 is negligible, the first output signal 4 is half the intensity of, and equal in phase to, the first input signal 2 and the second output signal 5 is half the intensity of, and opposite in phase to, the first input signal 2, as shown by rows 5 and 6 in Table 2. If the second input signal 3 is present and the first input signal 2 is negligible, the first output signal 4 and the second output signal 5 are half the intensity of, and equal in phase to, the second input signal 3, as shown by rows 7 and 8 in Table 2.

Non-3 dB couplers can also be used for the combiners 14, 15. Using non-3 dB couplers for the combiners 14, 15 alters the output signals 4, 5 that are produced by the 4-port coupler device 1. A non-3 dB coupler operates differently than a 3 dB coupler. If a single input signal is directed into either one of the input ports of a non-3 dB coupler functioning as a combiner, the output signal of the non-3 dB coupler is preferably equal in intensity and phase to the input signal. If two input signals of equal intensity, and either equal phase or opposite phase, are directed into a non-3 dB coupler functioning as a combiner, the output signal of the non-3 dB coupler is preferably the sum of the two input signals. If two input signals of unequal intensity, and either equal phase or opposite phase, are directed into a non-3 dB coupler functioning as a combiner, the output signal of the non-3 dB coupler is preferably also the sum of the two input signals.

Tables 3 summarizes the relative intensities and phases of example signals in the phase dependent splitter/combiner 4-port coupler device 1 using non-3 dB couplers for the combiners 14, 15. A negative value indicates a signal with a relative phase shift of 180°.

TABLE 3

| Signal | 2 | 3 | 16 | 17 | 18 | 20 | 4 | 19 | 22 | 21 | 5 |
|---|---|---|---|---|---|---|---|---|---|---|---|
| Value | 1 | 1 | 2 | 2 | 1 | 1 | 2 | 1 | -1 | 1 | 0 |
| Value | 1 | -1 | 2 | -2 | 1 | -1 | 0 | 1 | -1 | -1 | -2 |
| Value | -1 | 1 | -2 | 2 | -1 | 1 | 0 | -1 | 1 | 1 | 2 |
| Value | -1 | -1 | -2 | -2 | -1 | -1 | -2 | -1 | 1 | -1 | 0 |
| Value | 2 | 0 | 4 | 0 | 2 | 0 | 2 | 2 | -2 | 0 | -2 |
| Value | -2 | 0 | -4 | 0 | -2 | 0 | -2 | -2 | 2 | 0 | 2 |
| Value | 0 | 2 | 0 | 4 | 0 | 2 | 2 | 0 | 0 | 2 | 2 |
| Value | 0 | -2 | 0 | -4 | 0 | -2 | -2 | 0 | 0 | -2 | -2 |

Tables 4 summarizes the relative intensities and phases of the input and output signals 2, 3, 4, 5 for the example signals listed in Table 3.

TABLE 4

| Row | Signal | 2 | 3 | 4 | 5 |
|---|---|---|---|---|---|
| 1 | Value | 1 | 1 | 2 | 0 |
| 2 | Value | 1 | -1 | 0 | -2 |
| 3 | Value | -1 | 1 | 0 | 2 |
| 4 | Value | -1 | -1 | -2 | 0 |
| 5 | Value | 2 | 0 | 2 | -2 |
| 6 | Value | -2 | 0 | -2 | 2 |
| 7 | Value | 0 | 2 | 2 | 2 |
| 8 | Value | 0 | -2 | -2 | -2 |

The 4-port coupler device 1 performs a combiner operation and a replicator operation when non-3 dB couplers are used for the combiners 14, 15. If both 4-port coupler device input signals 2, 3 are present, the 2-port coupler device 1 performs a combiner operation, as shown by rows 1–4 in Table 4. In the combiner operation, the first output signal 4 is the phase dependent sum of the input signals 2, 3 and the second output signal 5 is the phase dependent difference between the second input signal 3 and the first input signal 2.

If only one of the 4-port coupler device input signals 2, 3 is present, the 4-port coupler device 1 performs a replicator operation, as shown by rows 5–8 in Table 4. In the replicator operation, if the first input signal 2 is present and the second input signal 3 is negligible, the first output signal 4 is equal in intensity and phase to the first input signal 2 and the second output signal 5 is equal in intensity, and opposite in phase, to the first input signal 2, as shown by rows 5 and 6 in Table 4. If the second input signal 3 is present and the first input signal 2 is negligible, the first output signal 4 and the second output signal 5 are equal in intensity and phase to the second input signal 3, as shown by rows 7 and 8 in Table 4.

Inverters can be used on any of the signals in the 4-port coupler device 1 to alter the output signals 4, 5 without adversely affecting the operation of the 4-port coupler device 1. For example, a second inverter can be placed between the first amplifier 9 and the first splitter 11 in the first duplicating stage 6 to invert the phase of the first amplified signal 16. This results in the output signals 4, 5 of the 4-port coupler device 1 being swapped, compared to the output signals 4, 5 of the 4-port coupler device 1 listed in Table 2. Therefore, the first output signal 4 is the phase dependent difference or partial difference between the second input signal 3 and the first input signal 2 and the second output signal 5 is the phase dependent sum or partial sum of the input signals 2, 3. Table 5 summarizes the example relative intensities and phases of the input and output signals 2, 3, 4, 5 for the 4-port coupler device 1 with a second inverter placed between the first amplifier 9 and the first splitter 11 in the first duplicating stage 6 and using 3 dB couplers for the combiners 14, 15.

TABLE 5

| Signal | 2 | 3 | 4 | 5 |
|---|---|---|---|---|
| Value | 1 | 1 | 0 | 2 |
| Value | 1 | −1 | −2 | 0 |
| Value | −1 | 1 | 2 | 0 |
| Value | −1 | −1 | 0 | −2 |
| Value | 2 | 0 | −1 | 1 |
| Value | −2 | 0 | 1 | −1 |
| Value | 0 | 2 | 1 | 1 |
| Value | 0 | −2 | −1 | −1 |

Figure 2:
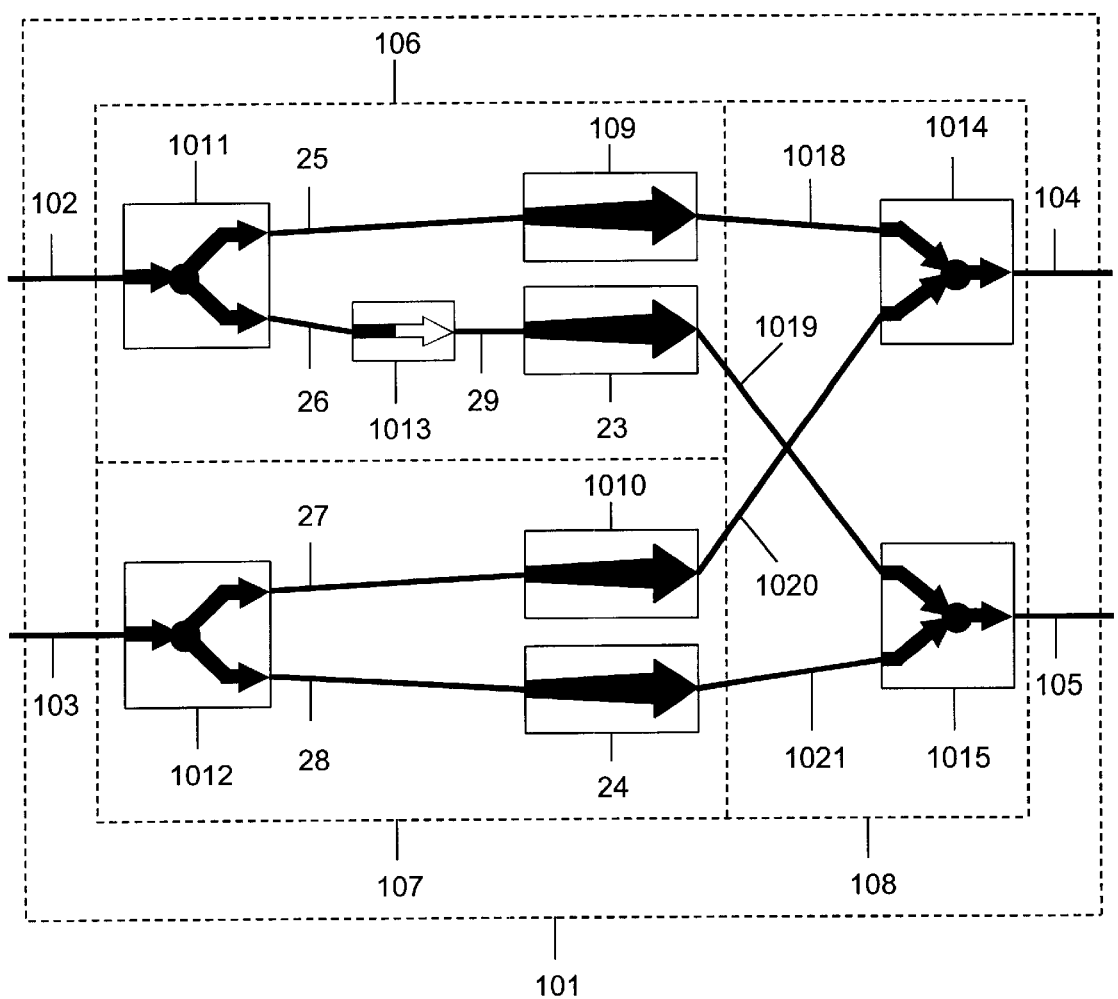
FIG. 2 is an alternative embodiment of FIG. 1.

In an alternative embodiment of the phase dependent splitter/combiner 4-port coupler device 1, four duplicated signals 1018, 1019, 1020, 1021 are generated using two splitters 1011, 1012 followed by four amplifiers 109, 23, 1010, 24 in two duplicating stages 106, 107. As well, a phase inverter 1013 is placed between the first splitter 1011 and the second amplifier 23 in the first duplicating stage 106. In a 4-port coupler device 101, shown in FIG. 2 where like numerals with a prefix 10 refer to similar elements of the 4-port coupler device 1 in FIG. 1, two input signals 102, 103 are directed into the duplicating stages 106, 107. The input signals 102, 103 are directed into the two splitters 1011, 1012 that produce four split signals 25, 26, 27, 28. The second split signal 26 is directed into the phase inverter 1013, which produces an inverted second split signal 29 that is opposite in phase to the second split signal 26. The inverted second split signal 29 and the three remaining split signals 25, 27, 28 are directed into the four amplifiers 109, 23, 1010, 24 producing the four duplicated signals 1018, 1019, 1020, 1021. The duplicated signals 1018, 1019, 1020, 1021 are directed into a cross-over stage 108 where the first duplicated signal 1018 and the third duplicated signal 1020 are combined by a first combiner 1014 to produce a first output signal 104 and the second duplicated signal 1019 and the fourth duplicated signal 1021 are combined in a second combiner 1015 to produce a second output signal 105.

In both embodiments of the 4-port coupler device 1, two or more components can be merged to provide the same functionality in a single smaller component. For example, in the first embodiment, the first amplifier 9 and the first splitter 11 can be implemented by an amplifying splitter, such as an erbium doped Y-branch, which receives an input signal and produces two output signals that are preferably equal to the input signal.

Figure 3:
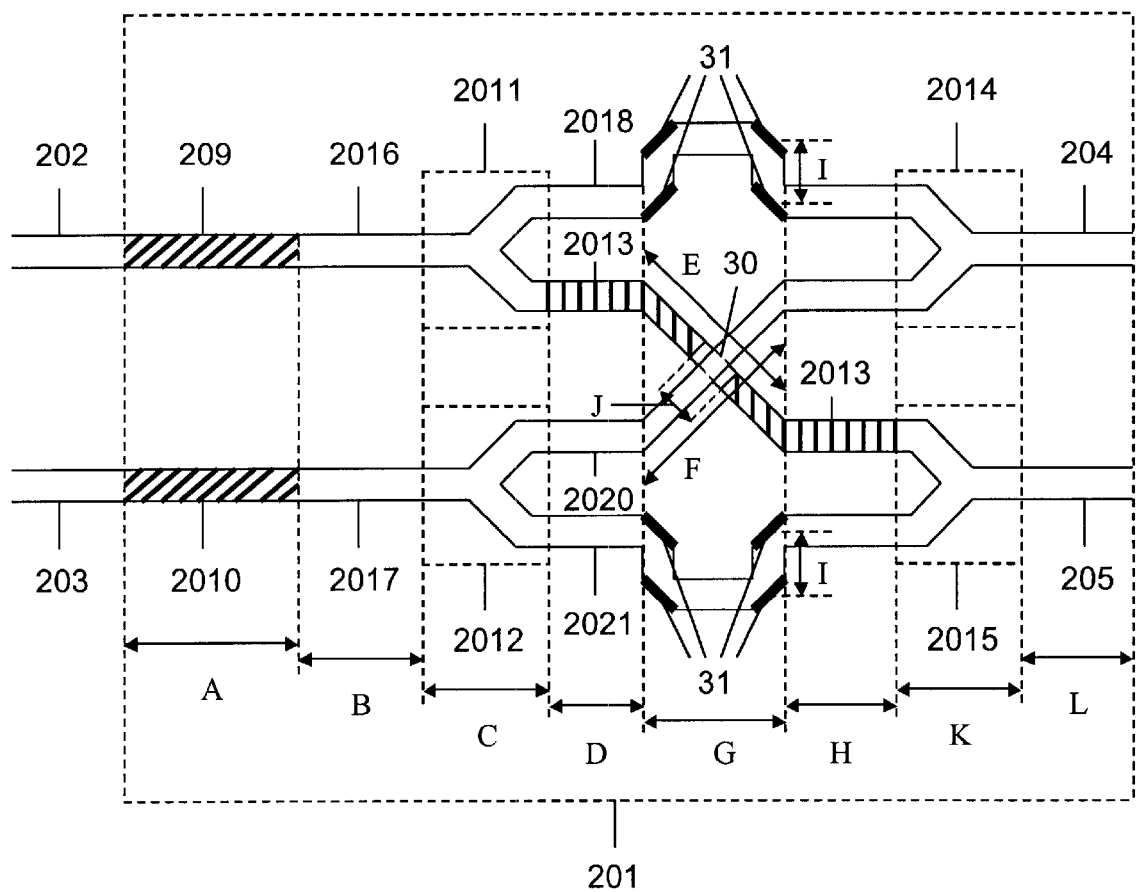
FIG. 3 is a design example of FIG. 1.

An integrated optic embodiment of the phase dependent splitter/combiner 4-port coupler device 1 employs commonly available integrated optic components and operates using laser beams, preferably. A design example 4-port coupler device 201, shown in FIG. 3 where like numerals with a prefix 20 refer to similar elements of the 4-port coupler device 1 in FIG. 1, uses laser light with a wavelength of 0.85 μm. The component dimensions are listed in Table 6.

TABLE 6

| Component | Length |
|---|---|
| A | 50.0 μm |
| B | 58.3 μm |

TABLE 6-continued

| Component | Length |
|---|---|
| C | 75.0 μm |
| D | 10.0 μm |
| E | 23.9 μm |
| F | 23.9 μm |
| G | 16.9 μm |
| H | 16.1 μm |
| I | 3.5 μm |
| J | 7.6 μm |
| K | 75.0 μm |
| L | 50.0 μm |

Integrated optic Y-branches 2011, 2012, 2014, 2015 are used for the splitters 11, 12 and the combiners 14, 15. Interconnecting waveguides 202, 203, 2016, 2017, 2018, 2020, 2021, 204, 205 are used to transmit signals from the output of one component to the input of the next component. The integrated optic Y-branches 2011, 2012, 2014, 2015 and the waveguides 202, 203, 2016, 2017, 2018, 2020, 2021, 204, 205 are composed of $Al_{0.3}Ga_{0.7}As$, have a substrate of $Al_{0.8}Ga_{0.2}As$, and have above the waveguide. The Y-branches 2011, 2012, 2014, 2015 and the waveguides 202, 203, 2016, 2017, 2018, 2020, 2021, 204, 205 are rib waveguides with a rib width of 1 μm and a rib height of 500 nm where the rib is etched 200 nm. The rib waveguides have an effective index of refraction of 3.247.

A phase inverter waveguide 2013 is similar in design to the other rib waveguides 202, 203, 2016, 2017, 2018, 2020, 2021, 204, 205, but is etched slightly more so that it has an effective index of refraction of 3.257. It is also divided by a short cross-over waveguide 30 that has an effective refractive index of 3.247. The phase inverter waveguide 2013 and the third duplicate signal waveguide 2020 are perpendicular to each other so that they do not cross-combine. The etching and length of the phase inverter waveguide 2013 and the etching and length of the cross-over waveguide 30, as indicated by D, E, H, and J in FIG. 3, result in an integral number of wavelengths plus a half-wavelength so that the second duplicated signal 19 is phase inverted. The number of wavelengths is $$\frac{3.257}{0.85 \text{ μm}}[10.0 \text{ μm} + (23.9 \text{ μm} - 7.6 \text{ μm}) + 16.1 \text{ μm}] + \frac{3.247}{0.85 \text{ μm}}(7.6 \text{ μm}) =$$

191.5 wavelengths where 3.257 is the effective refractive index of the phase inverter waveguide 2013, 3.247 is the effective refractive index of the cross-over waveguide 30, and 0.85 μm is the wavelength of light used.

Reflecting mirrors 31 are used to direct the beams through the two duplicated signal waveguides 2018, 2021 so that the duplicated signal waveguides 2018, 2020, 2021 and the phase inverter waveguide 2013 are the same length. Therefore, all signals have no more than ½ a wavelength difference in transmission length from the 4-port coupler device 201 input waveguides 202, 203 to the 4-port coupler device 201 output waveguides 204, 205.

Semiconductor laser amplifiers 209, 2010, typically composed of AlGaAs or InGaAsP, are used for the amplifiers 9, 10. The semiconductor laser amplifiers 209, 2010 in this design example have an effective index of refraction of 4.

Although the invention has been described with reference to certain specific embodiments, various modifications thereof will be apparent to those skilled in the art without departing from the spirit and scope of the invention as outlined in the claims appended hereto.

I claim:

1. A 4-port coupler device comprising:
   a) two duplicating stages for receiving two input signals and said duplicating stages producing four duplicated signals; and
   b) a cross-over stage for receiving said four duplicate signals and for producing two output signals, and said cross-over stage comprising at least one phase inverter for inverting the phase of one of said duplicated signals and two combiners for combining said duplicated signals to produce said two output signals.

2. A 4-port coupler device according to claim 1, wherein at least one of said duplicating stages comprises an amplifier for producing an amplified signal and a splitter for splitting said amplified signal to produce two of said duplicated signals.

3. A 4-port coupler device according to claim 2, wherein said amplifier is a semiconductor laser amplifier.

4. A 4-port coupler device according to claim 2, wherein said splitter is an integrated optic Y-branch.

5. 4-port coupler device according to claim 1, wherein at least one of said duplicating stages comprises a splitter for producing two split signals and two amplifiers for amplifying said split signals to produce two of said duplicated signals.

6. A 4-port coupler device according to claim 5, wherein said amplifiers are semiconductor laser amplifiers.

7. A 4-port coupler device according to claim 5, wherein said splitter is an integrated optic Y-branch.

8. A 4-port coupler device according to claim 1, wherein at least one of said duplicating stages includes at least one phase inverter for inverting the phase of at least one of said duplicated signals.

9. A 4-port coupler device according to claim 1, wherein said combiners are non-3 dB couplers.

10. A 4-port coupler device according to claim 9, that performs a replicator operation when one of said input signals is negligible.

11. A 4-port coupler device according to claim 9, that performs a combiner operation when both of said input signals are non-negligible.

12. A 4-port coupler device according to claim 1, wherein said signals are laser beams.

13. A 4-port coupler device according to claim 1, wherein said cross-over stage includes at least one additional phase inverter for inverting the phase of at least one of said duplicated signals.

14. A 4-port coupler device according to claim 1, wherein said combiners are 3 dB couplers.

15. A 4-port coupler device according to claim 14, that performs a splitter operation when one of said input signals is negligible.

16. A 4-port coupler device according to claim 14, that performs a combiner operation when both of said input signals are non-negligible.

17. A 4-port coupler device according to claim 1, wherein said combiners are integrated optic Y-branches.

* * * * *